(12) United States Patent
Witberg

(10) Patent No.: US 10,722,072 B2
(45) Date of Patent: Jul. 28, 2020

(54) SOUS VIDE RACK

(71) Applicant: Wihapa AS, Oslo (NO)

(72) Inventor: Knut Witberg, Oslo (NO)

(73) Assignee: WIHAPA AS, Oslo (NO)

( * ) Notice: Subject to any disclaimer, the term of this patent is extended or adjusted under 35 U.S.C. 154(b) by 319 days.

(21) Appl. No.: 15/564,789

(22) PCT Filed: Apr. 4, 2016

(86) PCT No.: PCT/NO2016/000013
§ 371 (c)(1),
(2) Date: Oct. 6, 2017

(87) PCT Pub. No.: WO2016/163889
PCT Pub. Date: Oct. 13, 2016

(65) Prior Publication Data
US 2018/0110365 A1     Apr. 26, 2018

(30) Foreign Application Priority Data
Apr. 8, 2015 (NO) .................................. 20150410

(51) Int. Cl.
*A47J 37/00* (2006.01)
*A47J 37/06* (2006.01)
(Continued)

(52) U.S. Cl.
CPC ....... *A47J 37/0694* (2013.01); *A47J 37/1295* (2013.01); *A47J 43/18* (2013.01)

(58) Field of Classification Search
CPC .. A47J 37/1295; A47J 37/1271; A47J 37/129; A47J 37/0694; A47J 37/049; A47J 43/18
(Continued)

(56) References Cited

U.S. PATENT DOCUMENTS 2,360,026 A * 10/1944 Wall .................... A47J 37/0694
 99/426
2,376,640 A * 5/1945 Wall .................... A47J 37/0694
 99/426
(Continued)

FOREIGN PATENT DOCUMENTS

EP     2036739 A1    3/2009
EP     3280305 A1    2/2018
(Continued)

OTHER PUBLICATIONS

Norwegian Search Report dated Sep. 15, 2015 issued in corresponding Norwegian Application No. 20150410.
(Continued)

*Primary Examiner* — Reginald Alexander
(74) *Attorney, Agent, or Firm* — Harness, Dickey and Pierce, P.L.C.

(57) ABSTRACT

A sous-vide rack system is disclosed. The system is to be used for supporting sous-vide food items inside sous-vide heating containers and comprises a bottom grating (20) with at least one mounting rail (23), each rail comprising at least one mounting arrangement. The system further comprises at least one separator with at least one separator foot (22) to be inserted into one of the at mounting arrangements. Finally, the system comprises a locking device (24) for at least one of the mounting rails to be used in the mounting rail to lock all into the mounting rail inserted separators by their separator feet to the mounting rail and thus the bottom grating.

6 Claims, 5 Drawing Sheets

(51) Int. Cl.
*A47J 43/18* (2006.01)
*A47J 37/12* (2006.01)

(58) Field of Classification Search
USPC ....... 99/415, 418, 416, 449, 421 V, 419, 426
See application file for complete search history.

(56) References Cited

U.S. PATENT DOCUMENTS

| | | | |
|---|---|---|---|
| 3,084,617 A * | 4/1963 | Jamentz | A47J 37/0694 99/426 |
| 5,445,062 A | 8/1995 | Polster | |
| 5,842,409 A * | 12/1998 | Loffler | A47J 43/18 99/421 V |
| 6,386,096 B1 * | 5/2002 | Tiemann | A47J 37/0694 211/181.1 |
| 7,669,523 B1 | 3/2010 | Zemel et al. | |
| 8,627,764 B1 | 1/2014 | Cloutier et al. | |
| 2009/0065452 A1 | 3/2009 | Smith | |
| 2010/0018413 A1 * | 1/2010 | Thomas | A47J 37/043 99/421 HV |
| 2013/0133528 A1 | 5/2013 | Cheung et al. | |
| 2014/0260998 A1 | 9/2014 | Pearson | |
| 2015/0342402 A1 * | 12/2015 | Bombard | A47J 37/0694 99/448 |

FOREIGN PATENT DOCUMENTS

| | | |
|---|---|---|
| WO | WO-2007/127075 A2 | 11/2007 |
| WO | WO-2011/031306 A2 | 3/2011 |

OTHER PUBLICATIONS

International Search Report PCT/ISA/210 for International Application No. PCT/NO2016/000013 dated Aug. 8, 2016.
Written Opinion of the International Searching Authority PCT/ISA/237 for International Application No. PCT/NO2016/000013 dated Aug. 8, 2016.

* cited by examiner

SOUS VIDE RACK

CROSS-REFERENCE TO RELATED APPLICATIONS

This application is a national phase under 35 U.S.C. § 371 of PCT International Application No. PCT/NO2016/000013 which has an International filing date of Apr. 4, 2016, which claims priority to Norwegian Application No. 20150410, filed Apr. 8, 2015, the entire contents of each of which are hereby incorporated by reference.

FIELD OF THE INVENTION

The present invention relates to "sous-vide" cooking equipment. More specifically, the invention relates to a rack system to arrange sous-vide cooking pouches inside a heating bath.

BACKGROUND

Sous vide cooking has become increasingly popular also for the "home chef" and more and more equipment becomes available for the private kitchen. The main tool is a heating unit, a container/vessel which can keep a fluid in the container at a constant temperature. Sous-vide cooking imply vacuum-packaging the food (meat, vegetables . . . ) into for instance tight pouches and placing these food items in the fluid where they might stay up to many hours. Since it is important, that the food is heated at quite a constant and precisely defined temperature, one has to make sure that all parts of the pouches with the food inside are heated to this temperature. It is therefore a great advantage that there is sufficient space between two adjacent pouches and between a pouch and the container wall respectively, such that the fluid can circulate freely to distribute the heat. The temperature depends on the food type, but is typically temperature between 50 and 73° Celsius.

A tool to achieve this equally distributed heating is called a rack. Conventional racks are bulky in size and cannot be collapsed to be stored away when not in use, the vacuum packed pouches are not held firmly in place and are sometimes placed horizontally which is not beneficial for natural heat circulation. The space available for the food pouches is typical held constant by separators which cannot be adjusted to fit to the thickness of the food/pouches. Further, the sizes of different containers cannot be used efficiently as the racks are usually square and of fixed size. Many racks cannot be lifted in and out of the container without the risk that food bags fall out of the rack.

The patent document WO 2011/031306 A2 discloses a prior art sous-vide cooking equipment including a rack (page 5).

US2014/0260998A1 describes a liquid-based cooking system for example «sous-vide»-apparatus, which among others comprises a support system in the form of a frame with three separate shelves/separator to hold individual food processing pouches. The support system is adjustable and may be lifted out of and lowered into the heated liquid. The document shows that a separator comprises a side which is inserted into a mounting arrangement of the frame.

From the above it is apparent that there exists a need to overcome the deficiencies of the prior art with a sous-vide cooking rack according to the independent claims of the attached claim set. The dependant claims disclose embodiments of the invention.

SUMMARY

The present invention discloses a sous-vide rack system to be used for supporting sous-vide food items inside a sous-vide heating container. The system comprises a bottom grating comprising at least one mounting rail, each comprising at least one mounting arrangement, at least one separator comprising at least one separator foot, said foot being inserted into one of the at least one mounting arrangements, and a locking device for at least one of the mounting rails being used in the mounting rail to lock all into the mounting rail inserted separators by their separator feet to the mounting rail and thus the bottom grating.

According to one embodiment, the rail has a substantially U-shaped cross section, the mounting arrangement is a pair of holes through the side walls of the U-shaped rail, penetrable by the feet of the at least one separator, and the locking device is a pin running inside the U-shaped rail and penetrating a hole comprised in each of the separator feet.

Another aspect of the invention is a sous-vide separator for use with the above mentioned sous-vide rack system comprising a plurality of distance elements adapted to be arranged as a group between two adjacent, essentially parallel food items in a sous-vide heating unit, where each distance element has two parallel long edges, each of the two edges supporting a respective one of the two adjacent food items in a vertical, convection supporting orientation, wherein the group of distance elements is equipped with at least one foot which is lockable to the above mentioned bottom grating of the sous-vide rack system.

The distance elements in a preferred embodiment of the sous-vide separator above are essentially rectangular inner frames arranged as a group by mounting them between two opposed sides of an outer frame, wherein a plane being given by each of the distance elements is substantially orthogonal to the plane of the outer frame, and at least one separator foot is provided onto said outer frame.

In a further preferred embodiment of a sous-vide separator, the group of distance elements is build as a zigzag-folded plate, where the fold edges constitute the parallel long edges.

In a further preferred embodiment of a sous-vide separator, the group of distance elements is implemented by a loosely wound helix made of a rod-shaped material with two ends, where each winding of the helix is shaped elongated rectangular with two long parallel edges and two short edges, and the two ends of the helix material are provided with separator feet.

BRIEF DESCRIPTION OF THE DRAWINGS

Below, the invention will be described in detail with reference to the drawings, where like numerals relate to like elements. For numerals consisting of a number and an appended letter, a usage of a numeral without a letter refers to any of the numerals with a letter: "22" stands for any of the numerals "22a" to "22e". In the drawings

DETAILED DESCRIPTION

Figure 1:
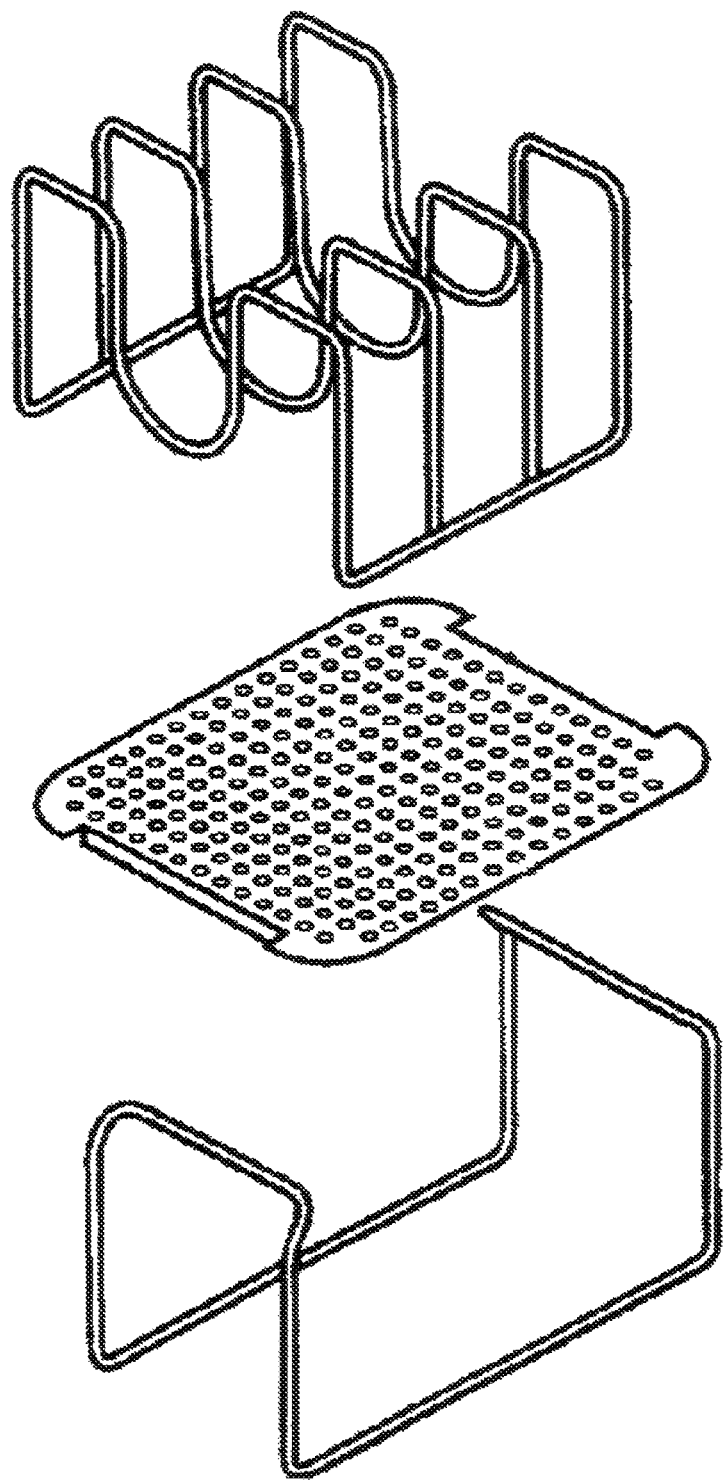
FIG. 1 shows a rack system according to prior art.

FIG. 1 shows a prior art sous-vide rack system according to international patent publication WO 2011/031306 A2.

The rack comprises a fixed set of separators and is combined with a bottom with convection holes and a device to lift it out of the bath.

Figure 2:
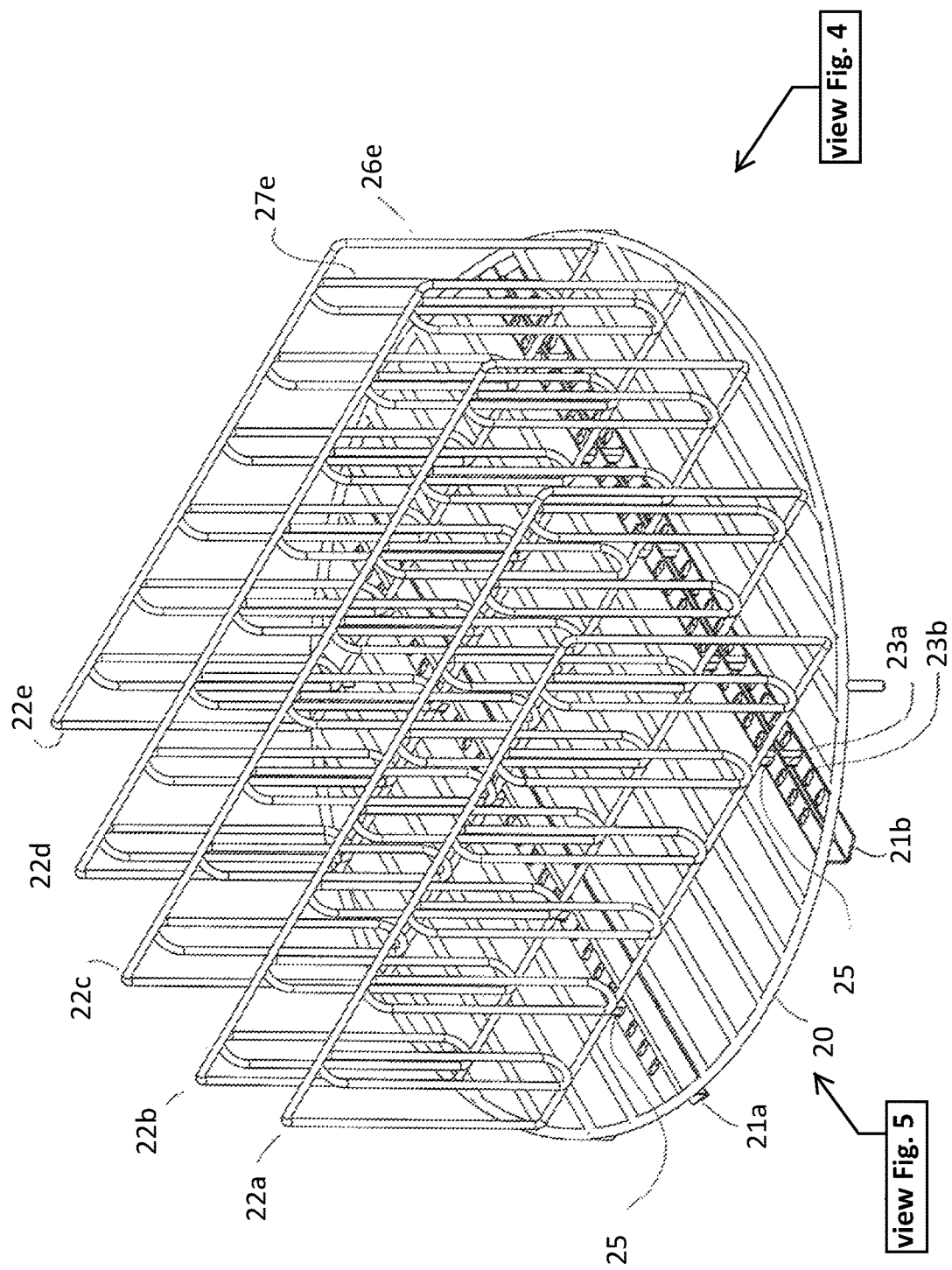
FIG. 2 shows a fully assembled rack according to the present invention.

FIG. 2 shows a sous-vide rack system according to the present invention. The bottom grating 20—hereinafter simply bottom—, in this case being a grid of typically water and heat resistant material, carries typically two parallel mounting rails 21a-21b, each with a plurality of mounting arrangements, in this embodiment hole pairs, e.g. hole pair 23a, 23b, arranged along each mounting rail 21a, 21b and—in this case—5 separators 22a-22e. The two holes of each hole pair make up a separator holder in that each separator having one foot 32a-32e for each mounting rail 21a, 21b, the feet penetrating both holes of the hole pairs. The bottom 20 in this case is circular, making it possible to use the rack in commonly available cooking equipment, e.g. a cooking pot, in a household kitchen. Due to the circular bottom, the separators have different length, with separator 22c being the longest and typically having a length corresponding to the diameter of the bottom 20. Alternatively, any other shape of the bottom can be chosen to adapt to differently shaped heating baths, where separators with equal length typically are chosen for a heating bath with rectangular cross section.

Figure 3:
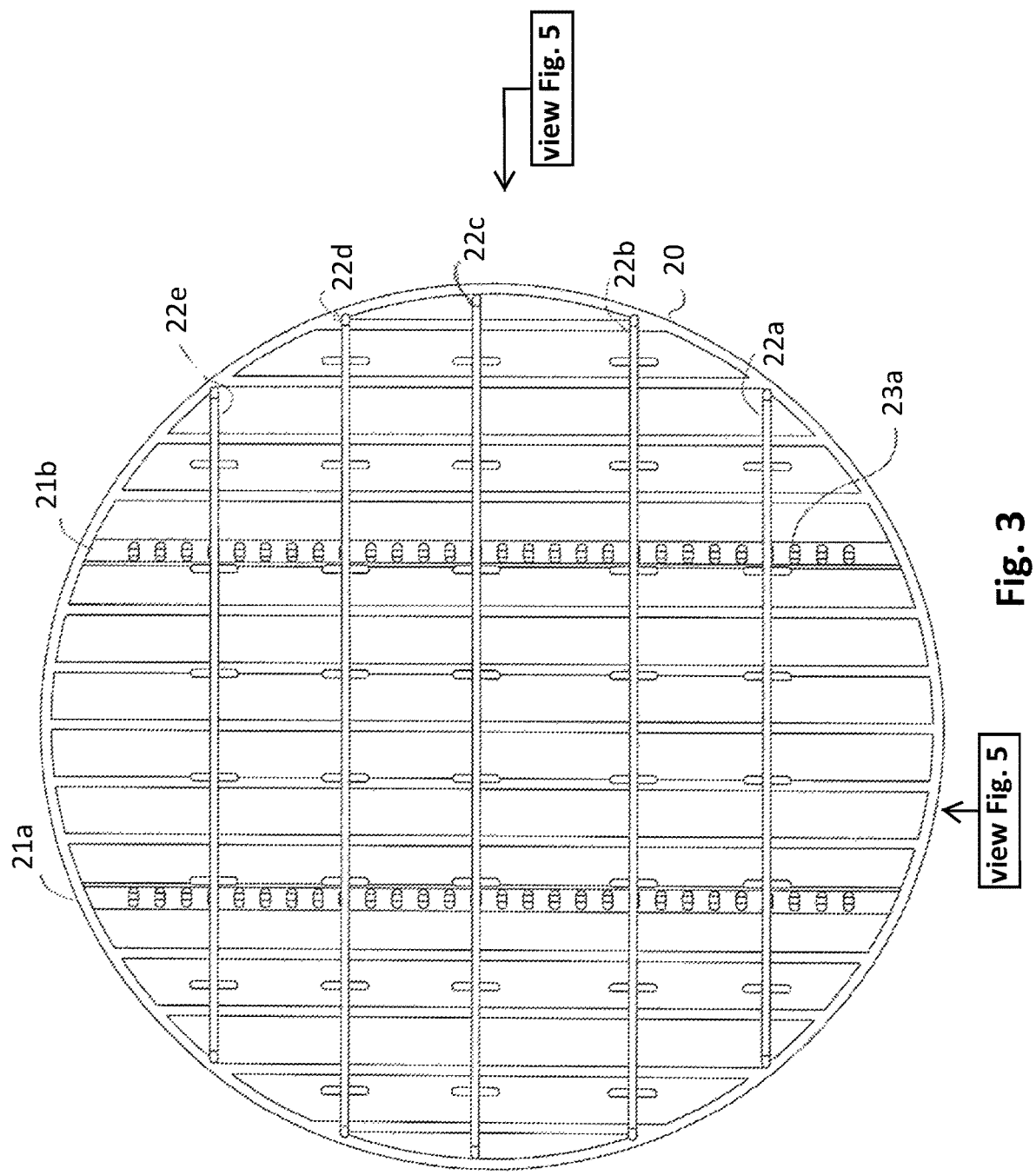
FIG. 3 shows the inventive rack system in a top view

FIG. 3 shows the inventive rack system in a top view. The series of holes in the mounting rails 21a, 21b can be seen, but only the upper holes (e.g. 23b) are visible in this drawing. Preferably, the hole pairs are equally spaced from each other along the mounting rails.

Figure 4:
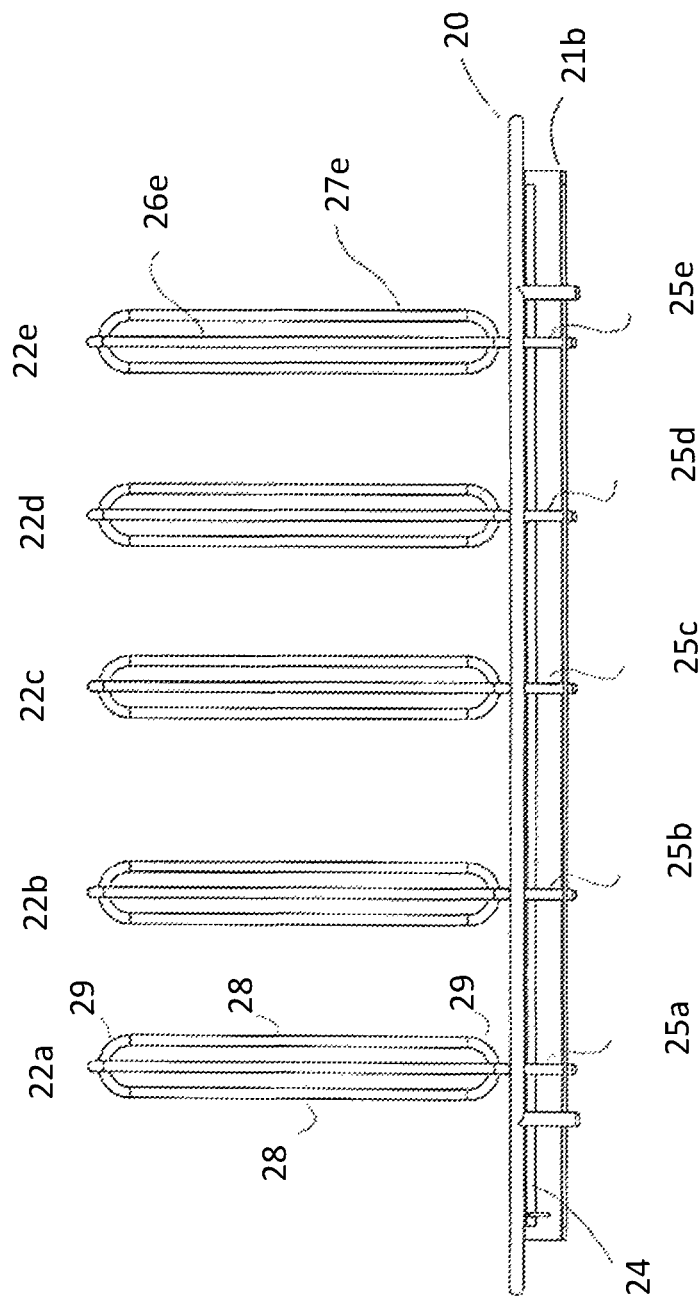
FIG. 4 shows the rack system in a side view, indicated in FIG. 4

FIG. 4 shows the rack system from a side view as indicated by an arrow in both FIG. 2 and FIG. 3. The view shows one rail 21b having a substantially U-shaped cross section lying on its side from the open side (the top of the "U") with the feet 32a-32e of the separators 22a-22e, each penetrating one hole pair (see detail 23a, 23b in FIG. 2). The separators are in this way stabilized in an upright position and a fixed position in relation to the mounting rail. The use of two parallel rails and two corresponding feet on each separator also stabilizes the separators in a rotary direction.

Back to FIG. 2, details of a preferred embodiment of the separators of the rack system will now be described. Separators have two tasks according to the present invention.

First—the prior art task—, a separator must keep two adjacent pouches (not shown) at a distance from each other. This is important since the heating fluid must have unrestricted and immediate access to the complete surface of all involved pouches. The fluid, when heated to a higher temperature, should be able to reach alt parts of all pouches at preferably the same time, which requires some circulation means. A natural circulation means for fluids being heated is convection. Thus the separators should as little as possible hinder convection between the pouches. With the present invention, this is achieved by building the preferred separator as a number of distance element which supports the sous-vide food pouches to be arranged in a substantially upright manner in the fluid.

Second, a separator can help to handle the rack in operation. In use, the bottom 20 and a lower part of the one or more separators are submerged in the container to such extend that all food pouches are completely surrounded by the fluid to achieve that the food pouches are evenly heated by the fluid. In case the fluid is a liquid—typically water—and the temperature is above about 60-70 degrees Celsius, the user needs a tool to lift the rack including food pouches out of the hot water to avoid injury/burning of the hands of the user. If a part of the separators 22a-22e extend above the fluid level in the bath, the separators could be used to lift the rack, provided they are locked in the hole pairs against removal. The top part of the separators need not as a whole to be above the fluid level, but can have some special feature on the top to support this function specifically. Such a feature—a hook, eye, handle, bale or similar—is however not shown in the drawings.

Figure 5:
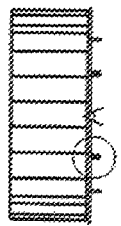
FIG. 5 shows details of the foot locking principle
Figure 5:
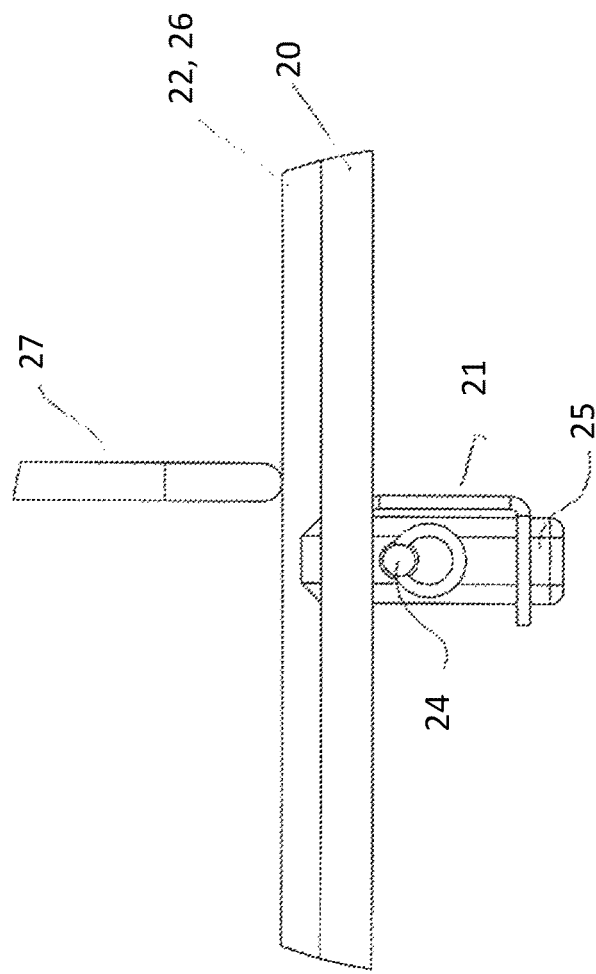

In the present invention, the above mentioned locking can be achieved with a locking device in an embodiment where the locking device is a locking pin 24 as shown in FIG. 4 and FIG. 5, which runs inside at least one mounting rail 21a, 21b which connects at least one foot 25a-25d of the inserted separator(s) to the mounting rail(s) and thus to the bottom grating 20. Any locked separator alone—or two locked separators at a greater distance from each other for better balance—can then be used to securely remove the complete rack including the pouches from the fluid without coming into contact with the hot fluid.

As disclosed above, the main function of the separators is to guarantee a minimum distance between adjacent food pouches. Therefore separators are assembled by at least two distance elements. Shown in FIGS. 2 and 4, the present invention discloses a preferred embodiment of a separator 22. It comprises an essentially rectangular outer frame 26 with two feet to be inserted and locked into a mounting rail hole pair 21b on the two ends of the lower side of the outer frame 26. Into the frame, there are mounted at least two substantially rectangular inner distance elements 27 arranged orthogonal with respect to the plane constituted by the outer frame 26, and extending between two opposite sides of the outer frame 26. The purpose of the distance elements 27 is to hold the food pouches at a sufficient distance from each other to allow unhindered convection of fluid. Without the distance elements, the pouches could be placed too close to each other and hinder convection.

An alternative embodiment of a separator comprises a loosely wound 'flat' helix ('loosely' meaning that the pitch of the winding is significantly larger than the thickness of the winding material), manufactured for instance from stainless steel rod of a few mm thickness, where the projection of the helix windings onto a plane orthogonal to the helix length has essentially the same shape ('flat') as the distance elements of the preferred separator embodiment above (best seen in FIG. 4), i.e. each single helix winding constitutes a distance element. An outer frame as in the first embodiment is not needed, since each helix winding is continued as the next winding. The ends of the rod constituting the rod helix are formed as two feet to be inserted into the mounting arrangements and locked to the bottom 20.

In both separator embodiments above, each winding of the helix or distance element respectively is shaped elongated with two long parallel sides (28) and two short sides (29) (thus: 'flat'), connecting the corresponding ends of the long sides. The short side can be outwards directed 180°-arcs or substantially straight connections or any other equivalent solution as known to those skilled in the art.

After usage of the rack system, the locking pin can be removed. This enables the separators to be removed from the hole pairs 23a, 23b, which again makes a space saving storage of rack bottom and separators possible. Also for sales packaging this can be an advantage. Then, before the next use of the sous-vide rack, the separators are inserted with there feet into hole pairs of the mounting rails of the bottom, and the locking pin(s) is/are inserted into the mounting rail(s) from one of the ends, locking all inserted separators to the mounting rail and thus to the bottom grating 20 of the rack. By choosing suitable hole pairs, the distance between adjacent separators is adjusted to fit the thickness of the food items.

The invention claimed is:

1. A sous-vide rack system configured to support sous-vide food items inside a sous-vide heating container, the sous-vide rack system comprising:
   a bottom grating including at least one mounting rail, each of the at least one mounting rail including at least one mounting arrangement;
   at least one separator, each including at least one separator foot, the at least one separator foot being inserted into one of the at least one mounting arrangements; and
   a locking device for at least one of the mounting rail, the locking device configured to lock each of the at least one separator inserted into the mounting rail by a respective one of the at least one separator foot to the at least one mounting rail and thus the bottom grating, wherein
   the at least one mounting rail has a substantially U-shaped cross section, and
   the at least one mounting arrangement is a pair of holes through side walls of the at least one mounting rail penetrable by the at least one separator foot.

2. The sous-vide rack system according to claim 1, wherein the locking device is a pin running inside the U-shaped rail and penetrating a hole in each of the at least one separator foot.

3. The sous-vide rack system according to claim 1, wherein the at least separator comprises:
   a plurality of distance elements, each of the plurality of distance elements having two parallel long edges, each of the two parallel long edges supporting a respective one of two adjacent food items in a vertical, convection supporting orientation while the two adjacent food items are essentially parallel in a sous vide heating unit, the plurality of distance elements being equipped with the at least one separator foot lockable to the at least one mounting rail of the bottom grating of the sous-vide rack system.

4. The sous-vide rack system according to claim 3, wherein
   the plurality of distance elements are essentially rectangular inner frames mounted between two opposed sides of an outer frame, wherein a plane of each of the plurality of distance elements is substantially orthogonal to a plane of the outer frame, and
   the at least one separator foot is on the outer frame.

5. The sous-vide rack system according to claim 3, wherein
   the plurality of distance elements being a zigzag-folded plate, the zigzag-folded plate including folds constituting the two parallel long edges.

6. The sous-vide rack system according to claim 3, wherein
   the plurality of distance elements being a loosely wound helix made of a rod-shaped material with two ends, the loosely wound helix including windings each shaped as an essentially elongated rectangular with two long parallel edges and two short edges, and
   the two ends of the loosely wound helix including respective ones of the at least one separator foot.

* * * * *